US011367091B2

(12) United States Patent
Zeng et al.

(10) Patent No.: US 11,367,091 B2
(45) Date of Patent: Jun. 21, 2022

(54) METHODS AND APPARATUS TO IDENTIFY RETAIL PRICING STRATEGIES

(71) Applicant: The Nielsen Company (US), LLC, New York, NY (US)

(72) Inventors: Han Zeng, Buffalo Grove, IL (US); Michael J. Zenor, Cedar Park, TX (US); Mitchel Kriss, Long Grove, IL (US)

(73) Assignee: Nielsen Consumer LLC, New York, NY (US)

( * ) Notice: Subject to any disclaimer, the term of this patent is extended or adjusted under 35 U.S.C. 154(b) by 479 days.

(21) Appl. No.: 15/380,327

(22) Filed: Dec. 15, 2016

(65) Prior Publication Data

US 2018/0174173 A1 Jun. 21, 2018

(51) Int. Cl.
*G06Q 30/02* (2012.01)
*G06F 16/28* (2019.01)

(52) U.S. Cl.
CPC ....... *G06Q 30/0206* (2013.01); *G06F 16/285* (2019.01)

(58) Field of Classification Search
CPC ................................................ G06Q 30/0206
See application file for complete search history.

(56) References Cited

U.S. PATENT DOCUMENTS

| | | | |
|---|---|---|---|
| 7,133,848 B2 | 11/2006 | Phillips et al. | |
| 7,321,865 B2 | 1/2008 | Kelly et al. | |
| 7,424,440 B1 | 9/2008 | Gupta et al. | |
| 7,848,946 B2 | 12/2010 | Acharya et al. | |
| 8,010,404 B1* | 8/2011 | Wu .................. | G06Q 30/02 705/1.1 |
| 8,234,225 B2 | 7/2012 | Davis et al. | |
| 8,275,682 B2 | 9/2012 | Johnson | |
| 8,364,516 B2 | 1/2013 | Anderson et al. | |
| 8,396,814 B1* | 3/2013 | Sundaram .............. | G06Q 30/02 705/400 |
| 8,412,560 B1 | 4/2013 | Masud et al. | |
| 2002/0107819 A1 | 8/2002 | Ouimet | |
| 2002/0198759 A1 | 12/2002 | Gilday et al. | |
| 2003/0097290 A1* | 5/2003 | Kiefer .................... | G06Q 10/06 705/7.35 |
| 2003/0154142 A1 | 8/2003 | Ginsburg et al. | |

(Continued)

OTHER PUBLICATIONS

Clemons, Eric K., "Resonance Marketing in the Age of the Truly Informed Consumer Creating Profits through Differentiation and Delight," Wharton ISE Blog 2 (Mar. 28, 2007), 8 pages.

Sirohi, Niren, et al., "A Model of Consumer Perceptions and Store Loyalty Intentions For a Supermarket Retailer," Journal of Retailing, vol. 74, No. 2 (Summer 1998), 15 pages.

(Continued)

*Primary Examiner* — Andre D Boyce
(74) *Attorney, Agent, or Firm* — Hanley, Flight & Zimmerman, LLC (57) ABSTRACT

Methods and apparatus to identify retail pricing strategies are disclosed herein. An example apparatus for identifying a pricing strategy employed by a store includes a calculator to calculate a first pricing strategy variable for the store based on sales data of the store. The example apparatus includes an index creator to index the first pricing strategy variable against aggregated data for a plurality of stores to generate a pricing index. The example apparatus includes a pricing strategy identifier to identify a pricing strategy for the store based on the pricing index.

21 Claims, 6 Drawing Sheets

(56) References Cited

U.S. PATENT DOCUMENTS

| | | | |
|---|---|---|---|
| 2003/0187708 A1* | 10/2003 | Baydar | G06Q 10/04 |
| | | | 705/7.29 |
| 2005/0060223 A1 | 3/2005 | Kelly et al. | |
| 2008/0294996 A1 | 11/2008 | Hunt et al. | |
| 2011/0071874 A1 | 3/2011 | Schneersohn et al. | |
| 2012/0330807 A1 | 12/2012 | Johnson | |
| 2013/0144713 A1 | 6/2013 | Anderson et al. | |
| 2013/0325556 A1* | 12/2013 | Kimmerling | G06Q 30/0206 |
| | | | 705/7.35 |
| 2014/0149183 A1 | 5/2014 | Liu et al. | |
| 2014/0180777 A1* | 6/2014 | Moshrefi | G06Q 20/20 |
| | | | 705/14.4 |
| 2014/0344020 A1* | 11/2014 | Thalken | G06Q 30/0206 |
| | | | 705/7.35 |
| 2015/0106163 A1 | 4/2015 | Rai et al. | |
| 2016/0253690 A1* | 9/2016 | Richardson | G06Q 30/0206 |
| | | | 705/7.35 |
| 2017/0109767 A1* | 4/2017 | Shpanya | G06Q 30/0283 |
| 2018/0018687 A1* | 1/2018 | Ouimet | G06Q 30/0206 |

OTHER PUBLICATIONS

Cohen, "Differentiated Product Demand Analysis with a Structured Covariance Probit: A Bayesian Econometric Approach," University of Connecticut, 2009, 197 pages.

Sirohi et al., "A Model of Consumer Perceptions and Store Loyalty Intentions for a Supermarket Retailer," Journal of Retailing, Summer 1998, 15 pages.

Aaker et al., Excerpts from "Marketing Research," John Wiley & Sons, Inc., 2001, 36 pages.

Yang et al., "Study on Pricing Strategy of Hybrid Distribution Channels of Cruise Companies," International Conference on Logistics Engineering, Management and Computer Science (LEMCS 2014), pp. 217-220, 4 pages.

Mahajan et al., "New Product Diffusion Models in Marketing: A Review and Directions for Research," American Marketing Association, The Journal of Marketing, vol. 54, No. 1 (Jan. 1990), pp. 1-26, 27 pages.

Malley, E. "Chapter 10, Understanding Your Competition: A Practical Guide to Competitor Intelligence," in The Business of Shareware, 1996, 19 pages.

\* cited by examiner

| Store ID | UPC | Week | Sales ($) | Unit Sales | EQ Unit Sales | BL Sales ($) | BL Unit Sales | BL EQ Unit | TPR |
|---|---|---|---|---|---|---|---|---|---|
| 1 | 123 | 1 | $17.97 | 3 | 11.7 | $19.98 | 2 | 7.98 | 1 |
| 1 | 123 | 2 | $11.98 | 2 | 7.8 | $19.98 | 2 | 7.98 | 1 |
| 1 | 123 | 3 | $29.95 | 5 | 19.5 | $19.98 | 2 | 7.98 | 1 |
| 1 | 123 | 4 | $53.91 | 9 | 35.1 | $19.98 | 2 | 7.98 | 1 |
| 1 | 123 | 5 | $11.98 | 2 | 7.8 | $19.98 | 2 | 7.98 | 1 |
| 1 | 123 | 6 | $9.99 | 1 | 3.9 | $19.98 | 2 | 7.98 | 0 |
| 1 | 123 | 7 | $41.93 | 7 | 27.3 | $19.98 | 2 | 7.98 | 1 |
| 1 | 123 | 8 | $29.95 | 5 | 19.5 | $19.98 | 2 | 7.98 | 1 |
| 1 | 123 | 9 | $29.97 | 3 | 11.7 | $19.98 | 2 | 7.98 | 0 |
| 1 | 123 | 10 | $23.96 | 4 | 15.6 | $19.98 | 2 | 7.98 | 1 |
| | | Total | $261.59 | 41 | 159.9 | $199.80 | 20 | 79.8 | |

| Store ID | UPC | Unit Price | EQ Price | BL Unit Price | BL EQ Price | Unit AM | EQ AM | TPR Dur. | TPR Freq. | EQ Unit |
|---|---|---|---|---|---|---|---|---|---|---|
| 1 | 123 (E) | $6.38 | $1.64 | $9.99 | $2.50 | 36% | 35% | 2.67 | 3 | 159.9 |
| 1 | 456 (E) | $3.89 | $0.66 | $5.32 | $1.11 | 27% | 41% | 1.05 | 10 | 15 |
| 1 | 789 (E) | $10.37 | $3.21 | $10.41 | $3.24 | 0% | 1% | 5.20 | 2 | 300 |

| Store ID | Unit Price | EQ Price | BL Unit Price | BL EQ Price | Unit AM | EQ AM | TPR Dur. | TPR Freq. | EQ Unit |
|---|---|---|---|---|---|---|---|---|---|
| 1 | $8.82 | $2.60 | $10.11 | $2.92 | 13% | 14% | 4.22 | 2.59 | 474.9 |
| 2 | $10.25 | $3.78 | $11.25 | $3.63 | 13% | 15% | 5.01 | 3.22 | 200 |
| 3 | $3.20 | $5.20 | $4.20 | $4.80 | 30% | 20% | 2.00 | 3.00 | 1000 |

FIG. 6

| Store ID | Unit Price | EQ Price | BL Unit Price | BL EQ Price | Unit AM | EQ AM | TPR Dur. | TPR Freq. |
|---|---|---|---|---|---|---|---|---|
| National | $5.64 | $4.29 | $6.72 | $4.13 | 23% | 18% | 2.99 | 2.91 |

FIG. 7

| Store ID | Unit Price | EQ Price | BL Unit Price | BL EQ Price | Unit AM | EQ AM | TPR Dur. | TPR Freq. |
|---|---|---|---|---|---|---|---|---|
| 1 | 145 | 61 | 150 | 71 | 57 | 78 | 141 | 89 |

METHODS AND APPARATUS TO IDENTIFY RETAIL PRICING STRATEGIES

FIELD OF THE DISCLOSURE

This disclosure relates generally to retail pricing, and, more particularly, to methods and apparatus to identify retail pricing strategies.

BACKGROUND

Retailers select different pricing strategies to compete with other retailers in the market. For example, a first retailer may employ a pricing strategy that offers deep discounts a few times a year while a second retailer may employ a pricing strategy that offers smaller, but more frequently offered discounts as compared to the first retailer. Pricing strategies can affect a retailer's position in the market with respect to product category growth, brand growth, and/or share growth.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Pricing strategies among retailers can differ based on one or more variables, such as discount amount, discount frequency, promotion period length, etc. Retailers are typically identified with a pricing strategy based on subjective impressions or general observations of the retailer's pricing activities rather than evidence-based classifications. For example, a retailer may be classified as employing an "Everyday Low Price" ("EDLP") pricing strategy based on observations of consumers (e.g., from survey data) that the retailer regularly offers lower prices for one or more products than other retailers. However, the retailer may actually be conducting frequent promotions and, thus, may be more appropriately categorized as using a "high-low/high discount frequency" pricing strategy. As another example, a nationwide retailer may instruct a local store to implement an EDLP pricing strategy as part of a retailer-wide pricing strategy to sell products at prices that are lower than average with fewer price reductions. A manager of the local store may believe that his or her store is implementing the EDLP price strategy (e.g., based on interviews with the store manager). However, due to local demands in the region in which the store is located, the local store may offer deep price reductions to attract shoppers to the store instead of selling products at lower than average prices. As such, the pricing strategy implemented by the local store may be more appropriately categorized "high-low/high discount" than EDLP. Such variations between the retailer-wide EDLP pricing strategy that the retailer expects the local store to implement and the actual pricing strategy being implemented by the store would be of interest to the retailer. Further, although predictive modeling techniques may be used for price optimization or to provide recommendations with respect to pricing strategies, such techniques do not identify the pricing strategy employed by the retailer.

Examples disclosed herein provide for an evidence-based determination of a pricing strategy employed by a store and/or a retailer including a chain of several stores based on promotional sales data accessed from the store and/or retailer. In examples disclosed herein, sales or transaction data is analyzed for one or more products in a product category (e.g., dry dog food) and/or product sub-category (e.g., basic dry dog food, premium dry dog food). Examples disclosed herein analyze the sales data with respect to price, frequency of price discounts offered by the store or retailer for the product(s), amplitude of the discount(s), and duration of the discount(s). Based on the multi-faceted and quantitative analysis of the sales data, examples disclosed herein automatically determine a pricing strategy employed by the stores(s) and/or retailer(s).

Examples disclosed herein provide a standardized, evidence-based approach for classifying stores and/or retailers by pricing strategy. Rather than labeling stores and/or retailers by pricing strategy based on subjective impressions, intuition, or conclusions derived from general observations of prices for goods sold by the store and/or retailer, disclosed examples identify the pricing strategy based on a data-driven analysis of promotional behavior. Thus, examples disclosed herein more accurately identify pricing strategies and reduce error in classifying store(s) and/or retailers as compared to approaches based on subjective impressions or surveys. Example disclosed herein can be used, for example, by a retailer to verify implementation of a selected retailer-wide pricing strategy by local stores. Further, disclosed examples improve computational efficiency and reduce processing resources in analyzing sales data for a store or retailer relative to national level data (e.g., data for a plurality of stores or retailers) by using data feeds received from store(s) and/or retailer(s) of interest to generate the national level data rather than storing large amounts of historical data. Thus, disclosed examples provide a technical improvement in the field of retail pricing over store and/or retailer classifications based on intuition-driven assumptions regarding pricing strategies.

Figure 1:
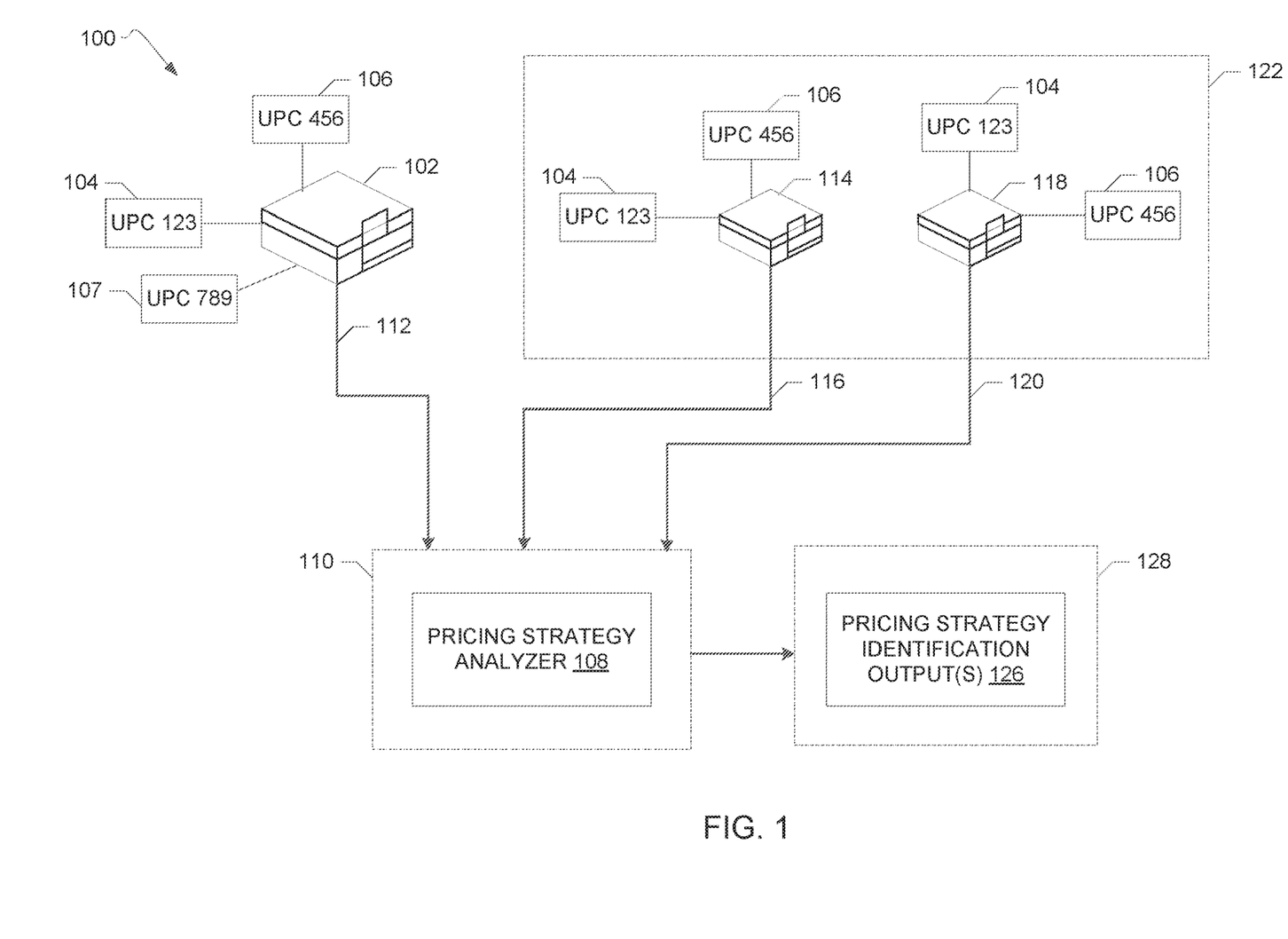
FIG. 1 illustrates an example environment in which a system constructed in accordance with the teachings disclosed herein operates.

FIG. 1 illustrates an example system 100 for identifying a pricing strategy of one or more stores and/or retailers with respect to one or more categories or sub-categories of products sold by the store(s). As illustrated in FIG. 1, a first store 102 sells a first product 104 associated with a first universal product code (UPC) "123," a second product 106 associated with a second UPC "456," and a third product 107 associated with a third UPC "789". The example first store 102 can sell additional or fewer products. The first, second, and third products 104, 106, 107 can be associated with a product category, such as, for example, dry dog food. For example, the first product 104 can be a first brand of dry dog food, the second product 106 can be a second brand of dry dog food, and the third product 107 can be a third brand of dry dog food. In other examples, two or more of the first, second, and third products 104, 106, 107 are associated with the same brand but represent different product offerings by the brand, such as basic dry dog food and/or premium dry dog food.

The example system 100 of FIG. 1 includes a pricing strategy analyzer 108. The example pricing strategy analyzer 108 of FIG. 1 can be implemented by, for example, a processor 110. In the example of FIG. 1, the pricing strategy analyzer 108 receives one or more data feeds containing product sales information from one or more stores and/or retailers and uses the data feeds to determine a pricing strategy employed by the store(s) and/or retailer(s). For example, the pricing strategy analyzer 108 of FIG. 1 receives a first data feed 112 from the first store 102. The first data feed 112 includes sales data regarding the first product 104, the second product 106, and/or the third product 107. As disclosed below, the first data feed 112 can include data such as an identifier for the first store 102 (e.g., a store number); the respective UPCs for the first product 104, the second product 106, and/or the third product 107; sales amounts (e.g., in dollars) of the first, second, and/or third products 104, 106, 107 (e.g., by week); price per unit for the product(s) 104, 106, 107; baseline (e.g., non-discounted) price for the products 104, 106, 107, etc. In some examples, the pricing strategy analyzer 108 receives different data feeds for each of the first, second, and third products 104, 106, 107.

As illustrated in FIG. 1, a second store 114 sells the first product 104 and the second product 106. In the example of FIG. 1, the example pricing strategy analyzer 108 receives a second data feed 116 from the second store 114. The second data feed 116 includes sales data regarding the first product 104 and/or the second product 106 sold by the second store 114. In other examples, the second data feed 116 includes sales data for one or more different products in the same product category as the first product 104 and/or the second product 106 (e.g., other brands of dry dog food).

As also illustrated in FIG. 1, a third store 118 sells the first product 104 and the second product 106 (e.g., in addition to other products). The example pricing strategy analyzer 108 receives a third data feed 120 including sales data regarding the first product 104 and/or the second product 106 sold by the third store 118.

In the example of FIG. 1, the second store 114 and the third store 118 are associated with a retailer 122. Other stores can also be associated with the retailer 122 such that the second store 114 and the third store 118 are chains of the retailer 122. For example, the third store 114 can be a Target™ store located in a first city and the third store 118 can be a Target™ store located in a second city. Additional stores can be associated with the retailer 122. In some examples, the first store 102 of FIG. 1 is associated with a retailer such as the retailer 122 or a different retailer (e.g., WalMart™).

The example pricing strategy analyzer 108 of FIG. 1 analyzes the respective data in the first data feed 112, the second data feed 116, and/or the third data feed 120 to identify a pricing strategy employed by the respective first, second, and/or third stores 102, 114, 118. As disclosed below, the pricing strategy analyzer 108 identifies the pricing strategy employed by, for example, the first store 102 for a category and/or sub-category of products associated with the first product 104, the second product 106, and/or the third product 107 based on the analysis of the first data feed 112 with respect to promotional sales activity for the products 104, 106, 107.

In the example of FIG. 1, the pricing strategy analyzer 108 generates a pricing strategy identification output 126 for each of the first, second, and/or third stores 102, 114, 118. In some examples, the pricing strategy analyzer 108 analyzes the pricing strategy identification outputs for the second and third stores 114, 118 to identify a pricing strategy for the retailer 122 and generates a corresponding retailer pricing strategy identification output 126. The pricing strategy identification output(s) 126 can be presented via one or more output devices 128, such as a display screen of a personal computing device.

Figure 2:
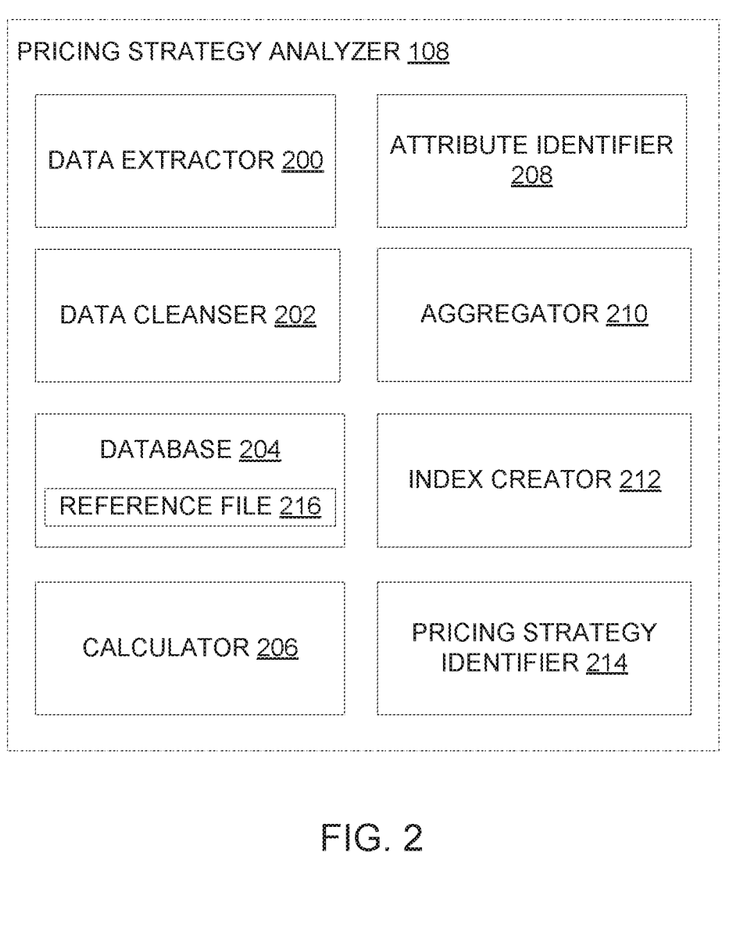
FIG. 2 is a block diagram of an example implementation of a portion of the system of FIG. 1.

FIG. 2 is a block diagram of an example implementation of the pricing strategy analyzer 108 of FIG. 1. As illustrated in FIG. 2, the pricing strategy analyzer 108 includes a data extractor 200. The example data extractor 200 receives one or more of the data feeds 112, 116, 120 from the respective stores 102, 114, 118. In some examples, the data extractor 200 formats the data received from one or more of the stores 102, 114, 118 for processing by the example pricing strategy analyzer 108 (e.g., organizes the data by UPC, time period, etc.).

The example pricing strategy analyzer 108 of FIG. 2 includes a data cleanser 202. After the data extractor 200 receives the first data feed 112 from the first store 102 (and/or the second and/or third data feed(s) 116, 120 from the respective second store 114 and/or the third store 118 of FIG. 1), the data cleanser 202 applies one or more rules to the data feed(s) to, for example, filter and/or format the data in the data feed(s). In the example of FIG. 2, the rule(s) applied by the data cleanser 202 are stored in a database 204 of the example pricing strategy analyzer 108.

For example, the data cleanser 202 can apply a rule to one or more of the data feed(s) 112, 116, 120 that only stores having sales data in all weeks for a predetermined study period such as 52 weeks are analyzed by the pricing strategy analyzer 108 to remove stores from the data feed(s) that, for example, are newly opened or have recently closed. As another example, the data cleanser 202 can apply a rule to one or more of the data feed(s) 112, 116, 120 that the only stores that have positive sales for the first and/or second product 104, 106 for all weeks in the study period are analyzed by the pricing strategy analyzer 108. The data cleanser 202 can apply a rule to one or more of the data feed(s) 112, 116, 120 that only products (e.g., as identified by UPC in the data feed(s)) having sales data in all weeks for the study period are analyzed by the pricing strategy analyzer 108 to remove new, temporary, and/or discontinued products from the data feed(s). As another example, the data cleanser 202 can apply a rule to one or more of the data feed(s) 112, 116, 120 that only products (e.g., as identified by UPC) that meet a predetermined threshold sales amount (e.g., a top 90% of store sales) are analyzed by the pricing strategy analyzer 108 to remove low sale products from the data feed(s). The example data cleanser 202 can apply one or more other rules to the data feed(s) 112, 116, 120 than the example rules disclosed herein.

The example pricing strategy analyzer 108 of FIG. 2 includes a calculator 206. The example calculator 206 calculates one or more pricing strategy variables based on data in the example data feeds 112, 116, 120. For example, the calculator 206 calculates the pricing strategy variables with respect to discount amplitude, discount frequency, discount duration, and price, including actual price and baseline or non-promotional price, for each store and each UPC.

The example pricing strategy analyzer 108 of FIG. 2 includes an attribute identifier 208. As disclosed above, the data feeds 112, 116, 120 include sales data for one or more products associated with a product category, such as dry dog food. In some examples, the attribute identifier 208 assigns each unique UPC in the data feed(s) with a sub-category identifier. For example, for the product category of dry dog food, sub-categories can include private label dry dog food (e.g., sold under a retailer's name) and non-private label dry dog food, which can be divided into the sub-categories of essential dry dog food, advanced dry food, and natural dry dog food. In some examples, the attribute identifier 208 tags the respective UPC(s) with the sub-category identifier (e.g., and "E" for essential dog food). The sub-category identifier can include other identifiers than letters (e.g., numbers, symbols).

The sub-categories identified by the attribute identifier 208 can be predefined (e.g., by a user) and stored in the example database 204 of the pricing strategy analyzer 108. In some examples, the database 204 includes one or more rules for identifying the UPC by sub-category. In some examples, the database 204 includes a listing of UPCs by known sub-category. The example attribute identifier 208 classifies the UPCs associated with the first product 104 and the second product 106 based on the predefined sub-categories. In other examples, the example attribute identifier 208 does not assign a sub-category identifier to a UPC (e.g., if there is data for only one product in the data feed).

The example pricing strategy analyzer 108 includes an aggregator 210 to aggregate the pricing strategy variable data associated with the respective UPCs at the UPC/sub-category level to a store/sub-category level. The example aggregator 210 of FIG. 2 also aggregates the data for each store (e.g., the first store 102, the second store 114, and the third store 118) to generate national data, or aggregated data for a plurality of stores, at the category and/or sub-category level. As disclosed below, the example aggregator 210 applies one or more weights to the pricing strategy variable data to generate the aggregated data at, for example, the store/sub-category level and/or the national data level.

The example pricing strategy analyzer 108 of FIG. 2 includes an index creator 212. The example index creator 212 indexes the aggregated pricing strategy variable data at the sub-category level or the category level for a respective store (e.g., the first store 102, the second store 114, and/or the third store 118) against the national data at the sub-category level or the category level. The example index creator 212 generates pricing indices based on the pricing strategy variables for the respective store.

The example pricing strategy analyzer 108 includes a pricing strategy identifier 214 to determine the pricing strategy for a store based on the index data generated by the index creator 212. For example, the pricing strategy analyzer 108 compares the pricing indices to known reference data for different types of pricing strategies that may be employed by a store at the category level and/or the sub-category level. In the example of FIG. 2, the database 204 includes a pricing strategy reference file 216. The example reference file 216 contains pre-defined pricing strategy variable data for one or more types of pricing strategies, such as (1) average (e.g., average price); (2) high-low/high discount (e.g., deep price reductions); (3) high-low/high discount frequency (e.g., frequent discounts); (4) high-low/high discount duration (e.g., infrequent discounts but long promotion periods); and (5) everyday low price ("EDLP") (e.g., lower than average price but small price reductions). The example pricing strategy identifier 214 compares the indices calculated for the respective stores to the data in the reference file 216.

In some examples, the pricing strategy identifier 214 uses one or more clustering techniques, such as k-means clustering, to cluster the index data for the store(s) based on the different known pricing strategies and identify the pricing strategy type for the stores based on where each store falls with respect to the clusters. Based on the clustering, the pricing strategy identifier 214 classifies the store(s) as employing a pricing strategy for a product category and/or a product sub-category. In some examples, the pricing strategy identifier 214 determines the pricing strategy employed by a store in two or more sub-categories (e.g., essential dry dog food, advanced dry dog food) and/or categories (e.g., dry dog food, women's shoes) to compare pricing strategies between sub-categories and/or categories and to identify the pricing strategy based on store or retailer promotion activity across different product groupings. In some examples, the pricing strategy identifier 214 identifies differences between pricing strategies employed by a store across different categories and/or sub-categories.

The pricing strategy identifier 214 generates the pricing strategy identification output(s) 126 for presentation via the output device(s) 128 of FIG. 1. The pricing strategy identification output 126 can include the pricing strategy classification for the stores 102, 114, 118. In some examples, the pricing strategy identification output 126 includes a summary of the data analysis performed by the pricing strategy analyzer 108.

Figure 3:
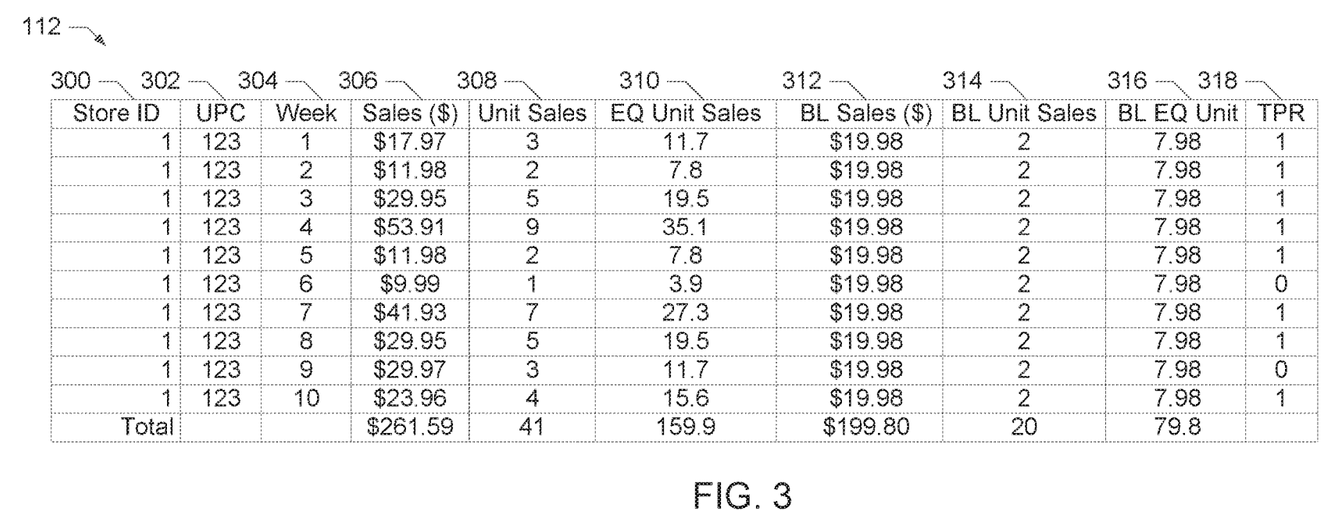
FIGS. 3-7 are example data tables generated by the example system of FIGS. 1 and 2 in accordance with the teachings disclosed herein.

FIG. 3 is a first example data table illustrating the example first data feed 112 containing sales data for the first product 104 (e.g., identified by UPC 123) sold by the first store 102 of FIG. 1. The example first data feed 112 can include data for the second product 106 (e.g., identified by the UPC 456), the third product 107 (e.g., as identified by the UPC 789), and/or other products sold by the first store 102 of FIG. 1. The example first data feed 112 of FIG. 2 is received and/or processed (e.g., organized, formatted) by the example data extractor 200 of the pricing strategy analyzer 108 of FIG. 2. Although the example of FIG. 3 is discussed in connection with the example first data feed 112 of the first store 102 of FIG. 1, the example data table of FIG. 3 can be associated with any of the other data feeds of FIG. 1 (e.g., the example second data feed 116 of the second store 114 and/or the example third data feed 120 of the third store 118).

As illustrated in FIG. 3, the example first data feed 112 includes a plurality of data fields. The example first data feed 112 can include other fields than illustrated in FIG. 3. The example first data feed 112 of FIG. 3 includes a store identifier field 300 containing an identifier for the first store 102, such as store number or other identifier (e.g., a store name and location identifier). The example first data feed 112 include a UPC field 302 identifying the UPC code for the first product 104 (e.g., UPC 123) and/or other products for which data is contained in the first data feed 112 (e.g., the second product 104 identified by UPC 456, the third product 107 identified by UPC 789).

The example first data feed 112 includes a time period field 304 that identifies a time period for which the data for the first product 104 is collected, such as by week. In some examples, the data is collected for a different time period than by week, such as months, quarters, etc. The example first data feed 112 can include data for the first product 104 and/or other products (e.g., the second product 106, the third product 107) collected for fewer or additional weeks than illustrated in FIG. 3.

The example first data feed 112 of FIG. 3 includes a sales amount field 306 containing sales amounts (e.g., in dollars) of the first product 104 by week. The example first data feed 112 of FIG. 3 includes a unit sales field 308 indicating a total number of units (e.g., boxes, cans, bottles, etc.) of the first product 104 sold at the first store 102 by week.

The example first data feed 112 includes additional data fields for the first product 104 and the second product 106. For example, the first data feed 112 includes an equalized (EQ) unit sales field 310 with respect to a standard measure for the first product 104 (e.g., pounds, cases, etc.). The first data feed 112 includes a baseline unit sales amount field 312 (e.g., in dollars), a baseline unit sales field 314, and a baseline equalized unit sales field 316, where baseline refers to non-promotional (e.g., non-discounted) activity. The example first data feed 112 also includes a temporary price reduction (TPR) field 318 with respect to promotions for the first product 104 that temporarily reduce the price of the first product 104. For example, the TPR field 318 can include a flag or counter indicating that there was a temporary price reduction (e.g., a discount) of the first product 104 during a week included in the first data feed 112.

Figure 4:
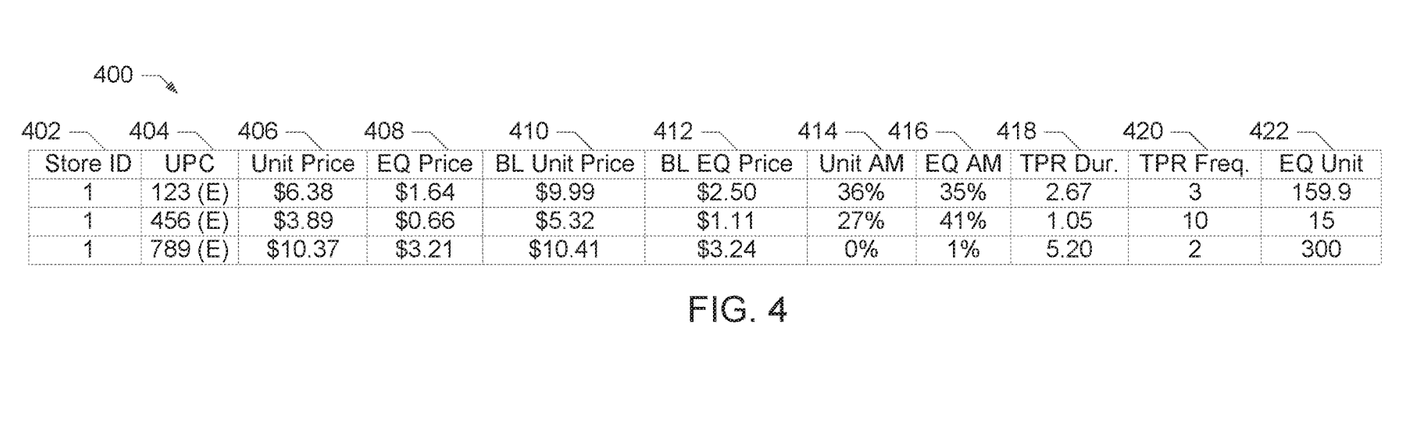

FIG. 4 is a second example data table 400 including pricing strategy variables calculated by the example calculator 206 of FIG. 2 based on the example first data feed 112 of FIG. 3 for the first product 104 (e.g., as identified by UPC 123 in the UPC field 302 of FIG. 3), the second product 106 (e.g., as identified by UPC 456 in the UPC field 302 of FIG. 3), and the third product 107 (e.g., identified by UPC 789 in the UPC field 302 of FIG. 3) sold by the first store 102 (e.g., as identified by the store identifier field 300 of the example first data feed 112 of FIG. 3). Although the example of FIG. 4 is discussed in connection with the example first data feed 112 of FIG. 3, the example calculator 206 can calculate the pricing strategy variables for any of second data feed 116 and/or the third data feed 120 substantially as disclosed in connection with the first data feed 112.

The second example data table 400 of FIG. 4 illustrates pricing strategy variables at the UPC level. As illustrated in FIG. 4, for each UPC in the first data feed 112 for the first store 102 (e.g., UPC 123 for the first product 104, UPC 456 for the second product 106, and UPC 789 for the third product 107), the example calculator 206 of the pricing strategy analyzer 108 of FIG. 2 calculates the pricing strategy variables using the data in the first data feed 112 and stores the variables in respective fields in the second example data table 400 by store identifier (e.g., a Store ID field 402) and UPC (e.g., a UPC field 404) as follows:

Unit Price (e.g., Total Sales ($)/Total Unit Sales), stored in a Unit Price field 406;

Equalized (EQ) Price (e.g., Total Sales ($)/Total EQ Unit Sales), stored in an EQ Price field 408;

Baseline (BL) Unit Price (e.g., Total BL Sales ($)/Total BL Unit Sales), stored a BL Unit Price field 410;

BL EQ Price (e.g., Total BL Sales ($)/Total BL EQ Units)), stored in a BL EQ Price field 412;

Unit Price Reduction Amplitude (e.g., 1−(EQ Price/BL EQ Price)), stored in a Unit Amplitude ("AM") field 414;

EQ Price Reduction Amplitude (e.g., 1−(Unit Price/BL Unit Price)), stored in a EQ AM field 416;

TPR Frequency (e.g., a count of unique TPR occurrences), stored in a TPR Frequency field 420;

TPR Duration (e.g., sum of TPR weeks/TPR Frequency), stored in a TPR Duration field 418; and EQ Unit (e.g., sum of the EQ units over the time period), stored in an EQ Unit field 422.

For example, the calculator 206 of FIG. 2 calculates the unit price for the first product 104 based on the total sales for the first product 104 over the ten week period in the sales amount field 306 of the first data feed 112 of FIG. 3 and the total number of unit sales for the first product 104 over the ten week period in the unit sales field 308 of the first data feed 112 (e.g., $261.59/41=$6.38).

In some examples, the data cleanser 202 and/or the calculator 206 of the example pricing strategy analyzer 108 of FIG. 2 applies one or more rules to the pricing strategy variables in the second example data table 400 of FIG. 4. For example, the data cleanser 202 can apply a rule that if a Unit Price Reduction Amplitude value in the Unit AM field 414 or a EQ Price Reduction Amplitude value in the EQ AM field 416 is less than a predefined threshold (e.g., −0.05), then the value(s) are outliers. For example, a negative value for a unit price reduction amplitude value or an EQ price reduction amplitude value indicates a price increase. Because an actual price of a product should be less than or equal to a baseline (e.g., non-promotional) price, the amplitude value(s) indicating a price increase are outliers or data errors. The data cleanser 202 can remove the pricing strategy variable data for the product containing outlier data from the second example data table 400 of FIG. 4. The data criteria rule(s) can be predefined (e.g., by a user) and stored in the database 204 of the example pricing strategy analyzer 108 of FIG. 2.

Thus, the example calculator 206 calculates the pricing strategy variables based on, for example, (1) discount amplitude (e.g., the unit price reduction amplitude stored in the Unit AM field 414 and the EQ price reduction amplitude stored in the EQ AM field 416); (2) discount frequency (e.g., the TPR frequency stored in the TPR Frequency field 420); (3) discount duration (e.g., the TPR duration stored in the TPR Duration field 418); and (4) price (e.g., unit price stored in the Unit Price field 406, EQ price stored in the EQ Price field 408, BL unit price stored in the BL Unit Price field 410, and BL EQ price stored in the BL EQ Price field 412). The example calculator 206 calculates the pricing strategy variables at the UPC level for each UPC in the data feed(s).

As disclosed above, in some examples, the attribute identifier 208 of the example pricing strategy analyzer 108 of FIG. 2 assigns each unique UPC in the data feed(s) with a sub-category identifier. As illustrated in the example second data table 400 of FIG. 4, the UPC for the first product 104 (e.g., UPC 123), the UPC for the second product 106 (e.g., UPC 456), the UPC for the third product 107 (e.g., UPC 789) are each tagged with the sub-category identifier "(E)" referring to essential dry dog food. In some examples, the sub-category identifier is included in a separate sub-category identifier field in the second example data table 400 of FIG. 4.

Continuing to refer to the example second data table 400 of FIG. 4, to aggregate the pricing strategy variable data at the UPC/sub-category level to the store/sub-category level, the example aggregator 210 of FIG. 2 applies the respective EQ unit values (e.g., a unit scale such as pound) in the EQ Unit field 422 of the example second data table 400 for each UPC as a weight to the other pricing strategy variables for the UPC in the data table 400. The example aggregator 210 aggregates the respective weighted pricing strategy variables for the UPCs to obtain aggregated store data.

Applying the EQ unit values as a weight enables the pricing strategy analyzer 108 to more accurately consider products that may be frequently promoted but do not generate large sales amounts when determining the pricing strategy for a store and/or a retailer. For example, the first product 104 (e.g., identified by the UPC 123) may account for 90% of sales at the first store 112 in the essential dry dog food sub-category. The second product 106 (e.g., identified by the UPC 456) may account for 10% of sales at the first store 102 in the essential dry dog food sub-category. However, the second product 106 may be more frequently promoted than the first product 104 (e.g., based on the respective data values in the TPR Duration field 418 and/or the TPR Frequency field 420 of the example second data table 400 of FIG. 4). Applying the EQ unit as a weight to the pricing strategy variables for the second product 106 enables the pricing strategy analyzer 108 to more accurately identify promotional behavior by the first store 102 despite, for example, low sales amounts generated by the frequently promoted second product 106.

Figure 5:
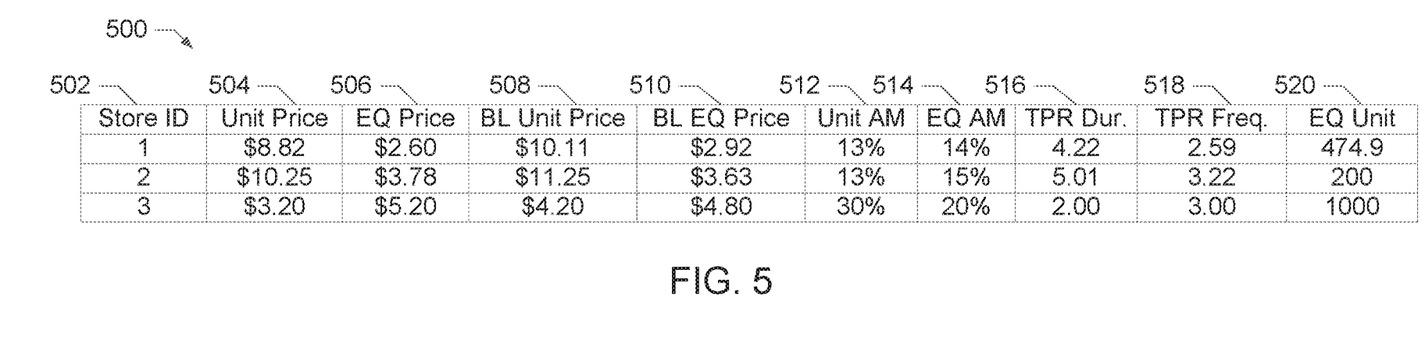

FIG. 5 is a third example data table 500 including example aggregated pricing strategy variable data for the first store 102 of FIG. 1 at the store/sub-category level generated by the aggregator 210 of the example pricing strategy analyzer 108 of FIG. 2. For example, the aggregated store data of the example data table 500 for the first store 102 of FIG. 1 (e.g., as identified by a Store ID field 502 of FIG. 5) can be associated with the sub-category of essential dry dog food. The aggregated store/sub-category data in example data table 500 includes data associated with the first product 104, the second product 106, the third product 107 and/or other products associated with UPCs that the attribute identifier 208 identifies as associated with the sub-category of essential dry dog food. Thus, as compared to, for example, the example data table 400 of FIG. 4 that includes pricing strategy variable data at the UPC level, the example data table 500 includes data for one more UPCs grouped by sub-category.

As an example, to calculate the aggregated unit price at the store level based on the data in the second example data table 400 of FIG. 4, the example aggregator 210 applies respective the EQ unit in the EQ Unit field 422 of FIG. 4 as a weight to the respective unit price data in the Unit Price field 406 for each UPC and aggregates the data (e.g., 159.9*$6.38+15*$3.89+300*$10.37)/(159.9+15+300)). The example aggregator 210 stores the resulting data in an Aggregated Unit Price field 504 of the third example data table 500 of FIG. 5. Similarly, the example aggregator 210 calculates aggregated data for the other pricing strategy variables in the second example data table 400 of FIG. 4 and stores the data in respective fields of the third example data table 500 of FIG. 5, including an Aggregated EQ Price field 506, an Aggregated BL Unit Price field 508, an Aggregated BL EQ Price field 510, an Aggregated Unit AM field 512, an Aggregated EQ AM field 514, an Aggregated TPR Duration field 516, and an Aggregated TPR Frequency field 518. In the example of FIG. 5, the aggregator 210 sums the EQ unit values for each of the UPCs in the second example data table 400 of FIG. 4 and stores the resulting value in an Aggregated EQ Unit field 520 of the third example data table 500 of FIG. 5.

As disclosed above with respect to FIG. 1, the example pricing strategy analyzer 108 can also receive the data feeds 116, 120 from the second store 114 and/or the third store 118. The example pricing strategy analyzer 108 analyzes the respective the data feeds 116, 120 from the second store 114 and/or the third store 118 substantially as disclosed above with respect to the first data feed 112 from the first store 102. For example, the calculator 206 of the example pricing strategy analyzer 108 of FIG. 2 calculates the pricing strategy variables such as the unit price and the unit price reduction amplitude (e.g., as disclosed above with respect to FIG. 4). The aggregator 210 of the example pricing strategy analyzer 108 of FIG. 2 aggregates the pricing strategy variables at the store level (e.g., as disclosed above with respect to FIG. 5) for the second and/or third stores 114, 118.

As illustrated in FIG. 5, the third example data table 500 also includes aggregated pricing strategy variable data for the second store 114, and the third store 118 (e.g., as identified by a Store ID field 502 of FIG. 5) at the store/sub-category level. For example, the aggregated store data of the example data table 500 for the second store 114 and the third store 118 can be associated with the sub-category of essential dog food. The example aggregator 210 calculates the aggregated data for the pricing strategy variables of the second store 114 and the third store 118 substantially as disclosed above with respect to the aggregated data for the first store 102 in the first row of the third example data table 500 of FIG. 5. Thus, the aggregated store/sub-category data in example data table 500 includes data associated with the first product 104, the second product 106, the third product 107, and/or other products associated with UPCs that the attribute identifier 208 identifies as associated with the sub-category of essential dry dog food and are sold by the first store 102, the second store 114, and/or the third store 118.

The example aggregator 210 of FIG. 2 aggregates the data for each store in the third example data table 500 of FIG. 5 to generate national data, or aggregated data for a plurality of stores, at the sub-category level. The example aggregator 210 applies the aggregated EQ unit value in the Aggregated EQ Unit field 520 of the third example data table 500 of FIG. 5 as a weight to each of the aggregated pricing strategy variables in the data table 500 of FIG. 5 by store. The example aggregator 210 aggregates the weighted data to generate the national level data.

Figure 6:
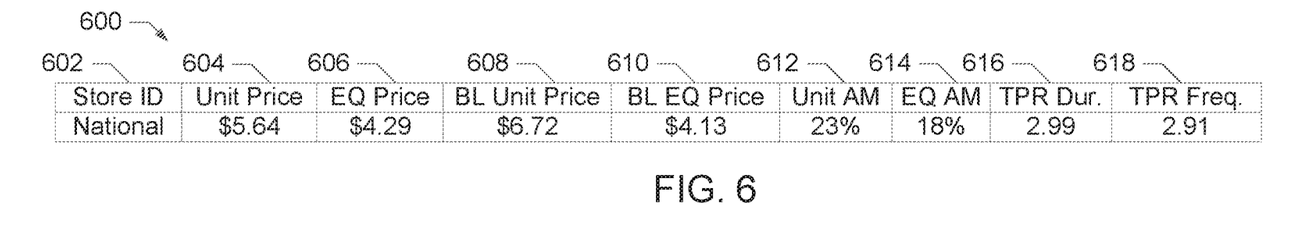

FIG. 6 is an example fourth data table 600 including national data for the pricing strategy variables of the first store 102, the second store 114, and the third store 118 based on the store data contained in the example third data table 500 of FIG. 5. For example, the calculate the unit price at the national data level, the example aggregator 210 applies respective the EQ unit values in the Aggregated EQ Unit field 520 of FIG. 5 as a weight to the respective unit price data in the Unit Price field 504 and aggregates the data (e.g., 474.9*$8.82+200*$10.25+1000*$3.20)/(474.9+200+
1000)). The example aggregator 210 stores the resulting data in a National Unit Price field 604 of the fourth example data table 600 of FIG. 6. Similarly, the example aggregator 210 calculates aggregated national data for the other pricing strategy variables in the third example data table 500 of FIG. 5 and stores the data in respective fields of the fourth example data table 600 of FIG. 6, including a National EQ Price field 606, a National BL Unit Price field 608, a National BL EQ Price field 610, a National Unit AM field 612, a National EQ AM field 614, a National TPR Duration field 616, and a National TPR Frequency field 618.

As disclosed above, the example index creator 212 of FIG. 2 indexes the respective aggregated pricing strategy variable data at the sub-category level for the first store 102, the second store 114, and/or the third store 118 against the national data at the sub-category level (e.g., the national data in the example data table 600 of FIG. 6). To calculate pricing indices for a store at the sub-category level, the example index creator 212 employs the formula (Store x/National y)*100, where x is a respective variable of the aggregated store data at the sub-category level for one of the stores (e.g., the unit price in the Unit Price field 504 of the example data table 500 of FIG. 5 for the first store 102) and y is a respective variable of the national data at the sub-category level (e.g., the unit price in the National Unit Price field 604 of the example data table 600 of FIG. 6).

Figure 7:
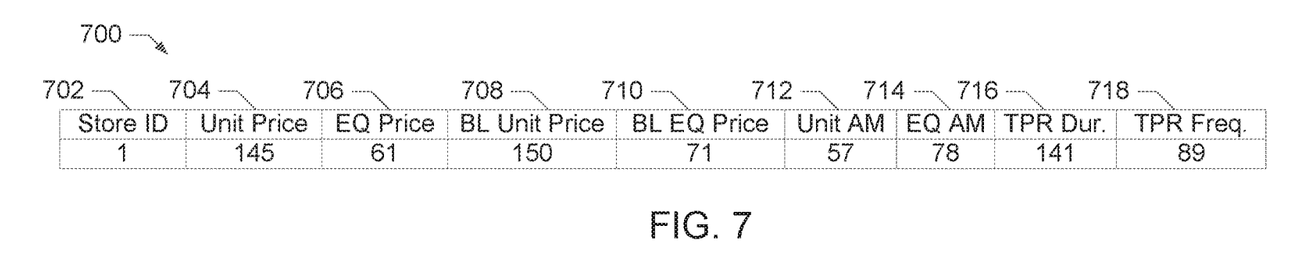

FIG. 7 is a fifth example data table 700 including pricing indices for the first store 102 of FIG. 1 (e.g., as identified by a Store ID field 702 of FIG. 7) calculated by the example index creator 212 of FIG. 2. Although the example data table 700 of FIG. 7 is discussed in connection with the example first store 102, the example index creator 212 can generate the example data table of FIG. 7 with respect to the second store 114, the third store 118, and/or the retailer 122. As illustrated in FIG. 7, the index creator 212 calculates indices for the unit price, EQ price, BL unit price, BL EQ price, unit price reduction amplitude, EQ price reduction amplitude, TPR duration, and TPR frequency and stores the indices in respective index fields 704-718. For example, the index creator 212 calculates the index for the EQ price for the first store 102 based on the value in the Aggregated EQ Price field 506 of FIG. 5 for the first store 102 and the National EQ Price field 606 of FIG. 6 (e.g., $2.60/$4.29*100).

The example pricing strategy identifier 214 of the example pricing strategy analyzer 108 of FIG. 2 uses the pricing indices calculated the index creator 212 (e.g., pricing indices in the fifth example data table 700 of FIG. 7) to determine a respective pricing strategy employed by the first store 102, the second store 114, the third store 118 at the category level (e.g., dry dog food) and/or sub-category level (e.g., essential dry dog food). As disclosed above, in some examples, the pricing strategy analyzer 108 compares the pricing indices for a store to pre-defined pricing strategy variable data for one or more types of pricing strategies stored in the reference file 216. For example, the reference file 216 can contain the example pre-defined pricing strategy variable data for different types of pricing strategies as shown below in Table 1:

TABLE 1

|  | Average | EDLP | Hi-Lo/High Discount | Hi-Lo/High Frequency | Hi-Lo/High Duration |
|---|---|---|---|---|---|
| TPR Freq. | 100 | 50 | 100 | 150 | 100 |
| TPR Duration | 100 | 50 | 100 |  | 150 |
| Unit Price | 100 | 50 | 100 | 100 | 100 |
| EQ Price | 100 | 50 | 100 | 100 | 100 |
| BL Price | 100 | 50 | 100 | 100 | 100 |
| BL EQ Price | 100 | 50 | 100 | 100 | 100 |
| Unit AM | 100 | 50 | 150 | 100 | 100 |
| EQ AM | 100 | 50 | 150 | 100 | 100 |

For example, to identify the pricing strategy employed by the first store 102, the pricing strategy identifier 214 compares the indices for each of the variables in the fifth example data table 700 of FIG. 7 to the indices in the reference file 216. The example pricing strategy identifier 214 clusters the index data for the first store 102 based on the data in the reference file 216 (e.g., via k-means clustering). In some examples, the pricing strategy identifier 214 calculates a difference between an index such as a unit price for a store with respect to the predefined unit price for each of known pricing strategies. In such examples, the pricing strategy identifier 214 classifies the store based on the comparisons of the store indices to the predefined pricing strategy data for each known pricing strategy type. The pricing strategy identifier 214 identifies the pricing strategy for the first store 102 based on where the first store 102 falls with respect to the clusters. The pricing strategy identifier 214 generates the pricing strategy identification output(s) 126 for presentation via the output device(s) 128 of FIG. 1.

As disclosed above, the example pricing strategy analyzer 108 can determine the pricing strategy employed by a store such as the first store 102 of FIG. 1, or a retailer, such as the retailer 122 of the FIG. 1. In some examples, to determine the pricing strategy employed by the retailer 122, the pricing strategy analyzer 108 classifies the pricing strategy employed by two or more stores of the retailer 122, such as the second store 114 and the third store 118. The pricing strategy identifier 214 classifies the retailer 122 based on the pricing strategies of the individual stores of the retailer 122 (e.g., based on the average classification or the most frequent pricing strategy classification of the individual stores). For example, the second store 114 and the third store 118 may fall within the same cluster such as the EDLP cluster based on the index data for each store relative to the known pricing strategy data in the reference file 216. Such results can indicate a chain-wide pricing strategy employed by the retailer 122 and, thus, the retailer 122 can be classified as employing the EDLP pricing strategy.

Thus, the example pricing strategy analyzer 108 can identify a pricing strategy for a retailer based on pricing strategies identified for stores associated with the retailer, where the respective store pricing strategies are determined from store-level data. In other examples, the pricing strategy analyzer 108 determines the pricing strategy for a retailer based on retailer level data. For example, the pricing strategy analyzer 108 can receive one or more data feeds containing sales data by retailer (e.g., a first data feed for a first retailer such as the retailer 122 of FIG. 1, a second data feed for a second retailer). The retailer data feeds can include, for example, sales amounts (e.g., in dollars) for the first product 104 by week for each retailer. The pricing strategy analyzer 108 analyzes the data in the retailer data feeds substantially as disclosed above with respect to the store data feeds 112, 116, 120 for the respective first, second, and third stores 102, 114, 118 for one or more product categories and/or sub-categories. For example, the calculator 206 of the example pricing strategy analyzer 108 calculates the pricing strategy variables such as the unit price reduction amplitude based on the retail level data in the retailer data feeds. The aggregator 210 aggregates the pricing data for each retailer to generate national data at the retailer level. In such examples, the index creator 212 indexes the data for a retailer such as the retailer 122 against the national data. The pricing strategy identifier 214 classifies the retailer (e.g., the retailer 122) based on the comparison of the index data for the retailer relative to known pricing strategies (e.g., based on clustering). Thus, the example pricing strategy identifier 214 can classify the type of pricing strategy employed by the retailer at the category and/or sub-category level based on analysis of retailer level data (as compared to using, for example, store level pricing strategy results to determine the retailer pricing strategy as disclosed above). Thus, the example pricing strategy analyzer 108 classifies one or more stores and/or retailers with respect to pricing strategy using an evidence-based analysis of sales data in one or more product categories and/or sub-categories. The example pricing strategy analyzer 108 characterizes the promotional behavior of the store(s) and/or retailer(s) with respect to discount frequency, discount amplitude, discount duration, and price to classify the stores and/or retailer(s). The pricing strategy analyzer 108 provides a standardized approach to classifying the store(s) and/or retailer(s) with respect to pricing strategy.

While an example manner of implementing the pricing strategy analyzer 108 is illustrated in FIGS. 1-2, one or more of the elements, processes and/or devices illustrated in FIGS. 1-2 may be combined, divided, re-arranged, omitted, eliminated and/or implemented in any other way. Further, the example data extractor 200, the example data cleanser 202, the example calculator 206, the example attribute identifier 208, the example aggregator 210, the example index creator 212, the example pricing strategy identifier 214 and/or, more generally, the example pricing strategy analyzer 108 of FIGS. 1-2 may be implemented by hardware, software, firmware and/or any combination of hardware, software and/or firmware. Thus, for example, any of the example data extractor 200, the example data cleanser 202, the example calculator 206, the example attribute identifier 208, the example aggregator 210, the example index creator 212, the example pricing strategy identifier 214 and/or, more generally, the example pricing strategy analyzer 108 of FIGS. 1-2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data extractor 200, the example data cleanser 202, the example calculator 206, the example attribute identifier 208, the example aggregator 210, the example index creator 212, the example pricing strategy identifier 214 and/or, more generally, the example pricing strategy analyzer 108 of FIGS. 1-2 is/are hereby expressly defined to include a tangible computer readable storage device or storage disk such as a memory, a digital versatile disk (DVD), a compact disk (CD), a Blu-ray disk, etc. storing the software and/or firmware. Further still, the example pricing strategy analyzer 108 of FIGS. 1-2 may include one or more elements, processes and/or devices in addition to, or instead of, those illustrated in FIGS. 1-2, and/or may include more than one of any or all of the illustrated elements, processes and devices.

Figure 8:
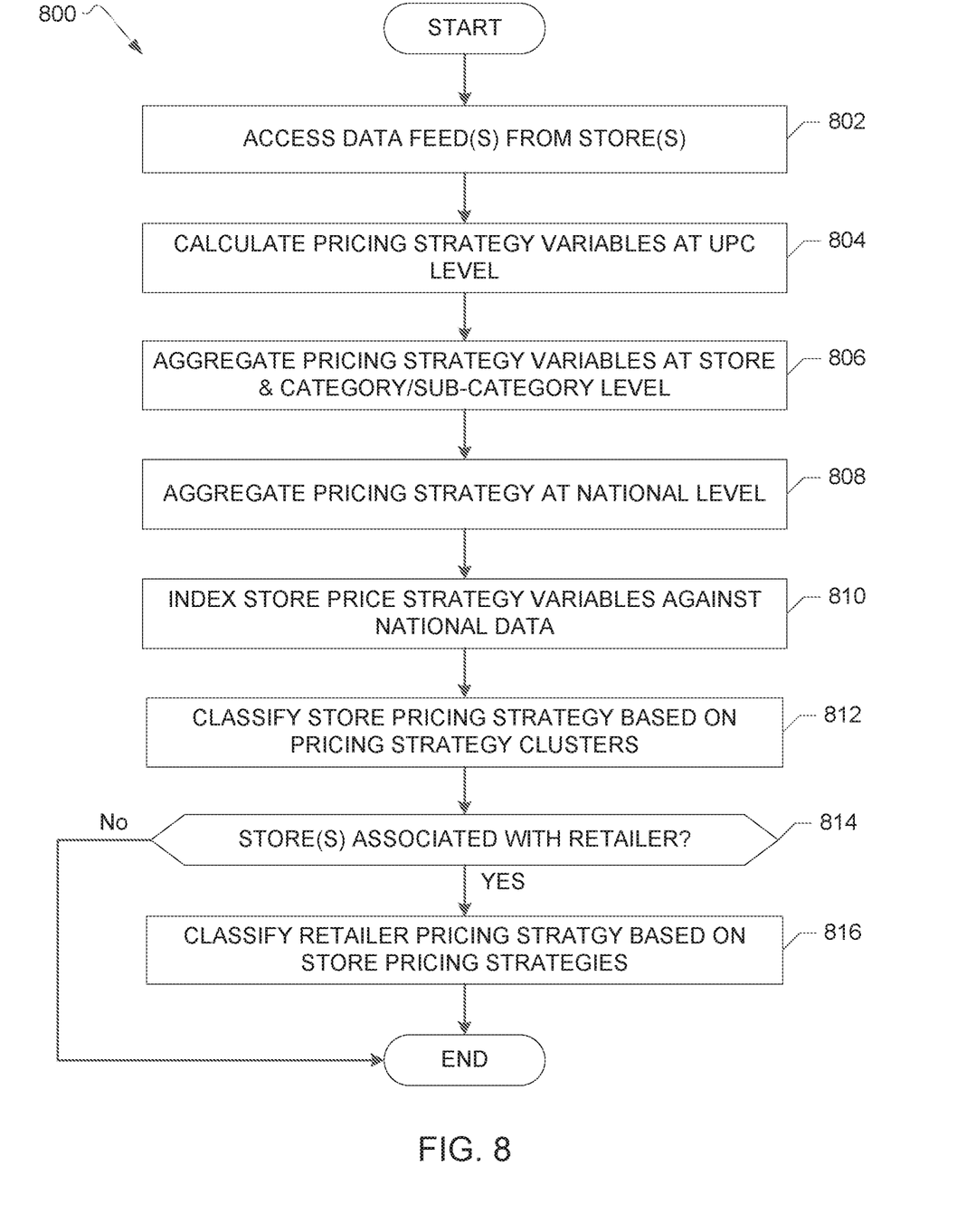
FIG. 8 is a flowchart representative of example machine readable instructions that may be executed to implement the example system of FIGS. 1-2.

A flowchart representative of example machine readable instructions for implementing the example pricing strategy analyzer 108 of FIGS. 1-2 is shown in FIG. 8. In this example, the machine readable instructions comprise a program for execution by a processor such as the processor 110 of FIG. 1 and shown in the example processor platform 900 discussed below in connection with FIG. 9. The program may be embodied in software stored on a tangible computer readable storage medium such as a CD-ROM, a floppy disk, a hard drive, a digital versatile disk (DVD), a Blu-ray disk, or a memory associated with the processor 110, but the entire program and/or parts thereof could alternatively be executed by a device other than the processor 110 and/or embodied in firmware or dedicated hardware. Further, although the example program is described with reference to the flowchart illustrated in FIG. 8, many other methods of implementing the example pricing strategy analyzer 108 of FIGS. 1-2 may alternatively be used. For example, the order of execution of the blocks may be changed, and/or some of the blocks described may be changed, eliminated, or combined.

As mentioned above, the example process of FIG. 8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIG. 8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program 800 of FIG. 8 begins at block 802 where the example data extractor 200 accesses one or more of the data feeds 112, 116, 120 from the respective stores 102, 114, 118 containing sales data for one or more of the products 104, 106, 107 in one or more categories (e.g., dry dog food) and/or sub-categories (e.g., essential dry dog food). In some examples, the data extractor 200 and/or the data cleanser 202 formats and/or filters the data in the data feeds 112, 116, 120 based on one or more rules stored in the database 204 of the pricing strategy analyzer 108 with respect to, for example, a time period covered by the data in the data feed(s).

The example calculator 206 calculates the pricing strategy variables based on the data in the data feeds 112, 116, 120 for one or more UPCs (block 804). For example, the calculator 206 calculates pricing strategy variables such as unit price, equalized price, unit price reduction amplitude, TPR duration, etc. substantially as disclosed above in connection with the example data table 400 of FIG. 4. In some examples, the attribute identifier 208 tags the UPCs with a sub-category identifier based one or more rules stored in the database 204 for identifying sub-categories, such as essential dry dog food.

The example aggregator 210 aggregates the pricing strategy variables at the store and category or sub-category level (block 806). For example, the example aggregator 210 aggregates the pricing strategy variable data associated with the UPC(s) for each of the store(s) 102, 114, 118 substantially as disclosed above in connection with the example data table 500 of FIG. 5. For example, the aggregator 210 applies the equalized unit value for each UPC as a weight to generate the aggregated store data level.

The example aggregator 210 aggregates the pricing strategy variable data at the national level using the aggregated pricing strategy variable data at the store level for two or more of the stores 102, 114, 118 (block 808). For example, the example aggregator 210 applies a respective aggregated equalized unit value for store (e.g., from the example store/sub-category level data table 500 of FIG. 5) as a weight to the aggregated pricing strategy variables for the store and aggregates the pricing strategy variables across stores substantially as disclosed above in connection with the example data tables 600 of FIG. 6.

The example index creator 212 indexes the aggregated store data for a store (e.g., as calculated at block 806) against the national data (e.g., as calculated at block 908) (block 810). The index creator 212 calculates the indices substantially as disclosed above in connection with the example data table 700 of FIG. 7 by, for example, finding a ratio a store level pricing strategy variable value to the corresponding national level pricing strategy variable value.

Based on the indices calculated by the example index creator 212, the pricing strategy identifier 214 classifies the store(s) 102, 114, 118 by pricing strategy (block 812). For example, the pricing strategy identifier 214 clusters (e.g., via k-means clustering) the store(s) 102, 114, 118 based on the index data and relative to predefined pricing strategy variable data for one or more known pricing strategies, such as EDLP or Hi-Lo/High discount stored in the reference file 216. The example pricing strategy identifier 214 analyzes the clustering of the store(s) 102, 114, 118 with respect to the known pricing strategies. The pricing strategy identifier 214 considers the pricing strategy variable data with respect to price, discount duration, discount frequency, and discount amplitude to identify or classify the pricing strategy employed by the store(s) 102, 114, 118. In some examples, the pricing strategy identifier 214 classifies the store pricing strategy based on store data for one or more product categories and/or sub-categories. The pricing strategy identifier 214 provides the store pricing strategy classification as the pricing strategy identification output 126.

The example program 800 includes a decision of whether the store(s) 102, 114, 118 are associated with a retailer such as the retailer 122 (block 814). If the store(s) 102, 114, 118 are not associated with a retailer, then the example program 800 ends.

If one or more of the store(s) 102, 114, 118 are associated with the retailer 122, the example program 800 includes analyzing the retailer pricing strategy based on the individual store pricing strategies (block 816). For example, the pricing strategy identifier 214 can determine that the second store 114 and the third store 118 employ are clustered in the same pricing strategy cluster (e.g., EDLP, Hi-Lo/high duration, etc.). Based on the determination that the second and third stores 114, 118 employ similar pricing strategies, the pricing strategy identifier can determine that the retailer 122 employs a chain-wide pricing strategy (i.e., the pricing strategy associated with the second and third store 114, 118). In other examples, the pricing strategy identifier 214 determines that stores 114, 118 of the retailer 122 employ different pricing strategies. In some such examples, the pricing strategy identifier 214 determines that the stores 114, 118 select a pricing strategy based on, for example, local or regional demands, rather than following chain-wide pricing strategies. The pricing strategy identifier 214 can provide the retailer pricing strategy classification as the pricing strategy identification output 126.

As disclosed above, in some examples, the pricing strategy analyzer 108 receives retailer level data feeds rather than store level data feeds (e.g., at block 802). In such examples, the program of FIG. 8 can be implemented to determine a pricing strategy for a retailer using the retailer level data substantially as disclosed above with respect to blocks 804-812. In such examples, instead of identifying the retailer pricing strategy based on the store level pricing strategies (e.g., as discussed at block 816), the pricing strategy identifier 214 identifies the pricing strategy for the retailer based on the clustering of the retailer level pricing data (e.g., as substantially discussed at block 812).

Figure 9:
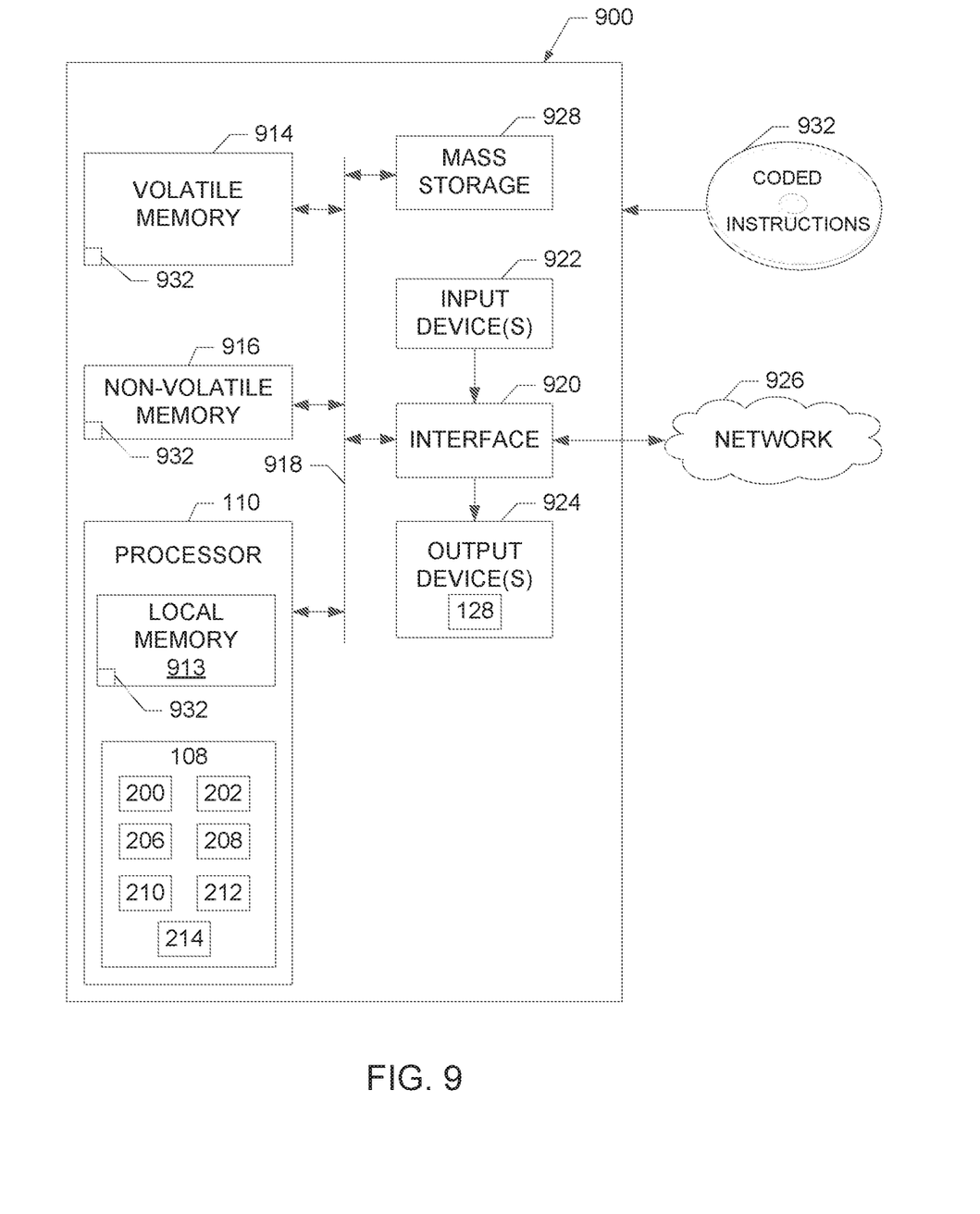
FIG. 9 illustrates and example processor platform that may execute the example instructions of FIG. 8 to implement the example system of FIGS. 1-2.

FIG. 9 is a block diagram of an example processor platform 900 capable of executing the instructions of FIG. 8 to implement the example data extractor 200, the example data cleanser 202, the example calculator 206, the example attribute identifier 208, the example aggregator 210, the example index creator 212, the example pricing strategy identifier 214, and/or, more generally, the example pricing strategy analyzer 108 of FIGS. 1-2. The processor platform 900 can be, for example, a server, a personal computer, a mobile device (e.g., a cell phone, a smart phone, a tablet such as an iPad™), a personal digital assistant (PDA), an Internet appliance, a set top box, or any other type of computing device.

The processor platform 900 of the illustrated example includes the processor 110. The processor 110 of the illustrated example is hardware. For example, the processor 110 can be implemented by one or more integrated circuits, logic circuits, microprocessors or controllers from any desired family or manufacturer.

The processor 110 of the illustrated example includes a local memory 913 (e.g., a cache). The processor 110 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 128, 924 are also connected to the interface circuit 920 of the illustrated example. The output devices 128, 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

Coded instructions 932 to implement the instructions of FIG. 8 may be stored in the mass storage device 928, in the volatile memory 914, in the non-volatile memory 916, and/or on a removable tangible computer readable storage medium such as a CD or DVD.

From the foregoing, it will be appreciated that the above disclosed systems, methods, apparatus improve the ability to identify a pricing strategy employed by one or more stores and/or retailers. Examples disclosed herein quantitatively analyze sales data for products in various product categories and/or sub-categories with respect to different aspects of product price promotions, including discount amplitude, discount duration, discount frequency, and price. Examples disclosed herein measure store and/or retailer level pricing strategies based on evidence and, thus, provide for more accurate classifications of the store(s) and/or retailer(s) as compared to classifications based on survey methods, intuition, etc. The pricing strategy classifications determined using disclosed examples can be used by a store and/or retailer to evaluate growth within one or more product categories in view of a pricing strategy associated with the product category.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus for identifying a pricing strategy employed by a first store, the apparatus comprising:
   memory;
   instructions in the apparatus; and
   processor circuitry to execute the instructions to:
      calculate a first value of a first pricing strategy variable for a first product and a second value of the first pricing strategy variable for a second product, the first value and the second value based on sales data of the first store corresponding to the first product and the second product, each of the first product and the second product associated with a product category;
      calculate a third value of a second pricing strategy variable for the first product and a fourth value of the second pricing strategy variable for the second product, the third value and the fourth value based on the sales data of the first store corresponding to the first product and the second product, the second pricing strategy variable different than the first pricing strategy variable, the first pricing strategy variable indicative of one of (a) a discount amplitude, (b) a discount frequency, or (c) a discount duration for the first product, and the second pricing strategy variable indicative of a different one of (a) the discount amplitude, (b) the discount frequency, or (c) the discount duration for the first product, the second pricing strategy variable not including the one of (a) the discount amplitude, (b) the discount frequency, or (c) the discount duration associated with the first pricing strategy variable;
      aggregate the first value and the third value to generate a first aggregated value of the first pricing strategy variable;
      aggregate the second value and the fourth value to generate a second aggregated value of the second pricing strategy variable;
      aggregate the first aggregated value and a third aggregated value associated with a second store to generate a first national value of the first pricing strategy variable; and
      aggregate the second aggregated value and a fourth aggregated value associated with the second store to generate a second national value of the second pricing strategy variable;
      index the first aggregated value against the first national value and the second aggregated value against the second national value to generate, respectively, a first pricing index for the first pricing strategy variable for the first store and a second pricing index for the second pricing strategy variable for the first store; and
      identify the pricing strategy for the first store from a set of pre-defined pricing strategies, the pre-defined pricing strategies having different combinations of reference pricing indices of pre-defined pricing strategy variables, the processor circuitry to identify the pricing strategy based on a comparison of the first pricing index and the second pricing index to the reference pricing indices of the pre-defined pricing strategy variables of the pre-defined pricing strategies.

2. The apparatus of claim 1, wherein the processor circuitry is to identify the product category associated with the sales data of the first store, the processor circuitry to identify the pricing strategy for the first store for the product category.

3. The apparatus of claim 2, wherein the processor circuitry is to identify the product category based on a uniform product code for the first product in the sales data and a uniform product code for the second product in the sales data.

4. The apparatus of claim 1, wherein the pricing strategy is a first pricing strategy, and wherein the first store is associated with a retailer, the retailer associated with at least one of the second store or a third store, the processor circuitry to identify the pricing strategy for the retailer based on the first pricing strategy for the first store and a second pricing strategy for the at least one of the second store or the third store.

5. The apparatus of claim 1, wherein the processor circuitry is to identify the pricing strategy for the first store based on a comparison of the first pricing index to first reference pricing indices of the set of pre-defined pricing strategies corresponding to the first pricing strategy variable.

6. The apparatus of claim 1, wherein the processor circuitry pricing is to cluster the first store based on the first pricing index relative to the reference pricing indices.

7. The apparatus of claim 1, wherein the processor circuitry is to generate the first aggregated value of the first pricing strategy valuable by:
   weighting the first value with a first number of equalized units sold of the first product; and
   weighting the second value with a second number of equalized units sold of the second product.

8. The apparatus of claim 7, wherein the processor circuitry is to generate the second aggregated value of the second pricing strategy valuable by:
   weighting the third value with the first number of equalized units sold of the first product; and
   weighting the fourth value with the second number of equalized units sold of the second product.

9. The apparatus of claim 1, wherein the processor circuitry is to generate the first national value of the first pricing strategy by weighting the first aggregate value with a number of equalized units of the first product and the second product sold by the first store.

10. A method for identifying a pricing strategy employed by a first store, the method comprising:

calculating, by executing an instruction with a processor, a first value of a first pricing strategy variable for a first product and a second value of the first pricing strategy variable for a second product, the first value and the second value based on sales data of the first store corresponding to the first product and the second product, each of the first product and the second product associated with a product category;

calculating, by executing an instruction with a processor, a third value of a second pricing strategy variable for the first product and a fourth value of the second pricing strategy variable for the second product, the third value and the fourth value based on the sales data of the first store corresponding to the first product and the second product, the second pricing strategy variable different than the first pricing strategy variable, the first pricing strategy variable indicative of one of (a) a discount amplitude, (b) a discount frequency, or (c) a discount duration for the first product, and the second pricing strategy variable indicative of a different one of (a) the discount amplitude, (b) the discount frequency, or (c) the discount duration for the first product, the second pricing strategy variable not including the one of (a) the discount amplitude, (b) the discount frequency, or (c) the discount duration associated with aggregating, by executing an instruction with the processor, the first value and the third value to generate a first aggregated value of the first pricing strategy variable;

aggregating, by executing an instruction with the processor, the second value and the fourth value to generate a second value of the second aggregated pricing strategy variable;

aggregating, by executing an instruction with the processor, the first aggregated value and a third aggregated value associated with a second store to generate a first national value of the first pricing strategy variable;

aggregating, by executing an instruction with the processor, the second aggregated value and a fourth aggregated value associated with the second store to generate a second national value of the second pricing strategy variable;

indexing, by executing an instruction with the processor, the first aggregated value against the first national value and the second aggregated value against the second national value to generate, respectively, a first pricing index for the first pricing strategy variable for the first store and a second pricing index for the second pricing strategy variable for the first store; and identifying, by executing an instruction with the processor, the pricing strategy for the first store from a set of pre-defined pricing strategies, the pre-defined pricing strategies having different combinations of reference pricing indices of pre-defined pricing strategy variables, the pricing strategy identified by comparing the first pricing index and the second pricing index to the reference pricing indices of the pre-defined pricing strategy variables of the pre-defined pricing strategies.

11. The method of claim 10, further including:
identifying the product category associated with the sales data of the first store; and
identifying the pricing strategy for the first store for the product category.

12. The method of claim 10, wherein the pricing strategy is a first pricing strategy, and wherein the first store is associated with a retailer, the retailer associated with at least one of the second store or a third store, the method further including identifying a pricing strategy for the retailer based on the first pricing strategy and a second pricing strategy for the at least one of the second store or the third store.

13. The method of claim 10, further including identifying the pricing strategy for the first store based on a comparison of the first pricing index to first reference pricing indices of the set of pre-defined pricing strategies corresponding to the first pricing strategy variable.

14. The method of claim 10, further including clustering the first store based on the first pricing index relative to the reference pricing indices.

15. A non-transitory computer-readable medium comprising instructions that, when executed, cause a processor to, at least:

calculate a first value of a first pricing strategy variable for a first product and a second value of the first pricing strategy variable for a second product, the first value and the second value based on sales data of a first store corresponding to the first product and the second product, each of the first product and the second product associated with a product category;

calculate a third value of a second pricing strategy variable for the first product and a fourth value of the second pricing strategy variable for the second product, the third value and the fourth value based on the sales data of the first store corresponding to the first product and the second product, the second pricing strategy variable different than the first pricing strategy variable, the first pricing strategy variable indicative of one of (a) a discount amplitude, (b) a discount frequency, or (c) a discount duration for the first product, and the second pricing strategy variable indicative of a different one of (a) the discount amplitude, (b) the discount frequency, or (c) the discount duration for the first product, the second pricing strategy variable not including the one of (a) the discount amplitude, (b) the discount frequency, or (c) the discount duration associated with the first pricing strategy variable;

aggregate the first value and the second value to generate a first aggregated value of the first pricing strategy variable data;

aggregate the third value and the fourth value to generate a second aggregated value of the second pricing strategy variable data;

aggregate the first aggregated value and a third aggregated value associated with a second store to generate a first national value of the first pricing strategy variable;

aggregate the second aggregated value and a fourth aggregated value associated with the second store to generate a second national value of the second pricing strategy variable;

index the first aggregated value against the first national value and the second aggregated value against the second national value to generate, respectively, a first pricing index for the first pricing strategy variable for the first store, and a second pricing index for the second pricing strategy variable for the first store; and identify a pricing strategy for the first store from a set of pre-defined pricing strategies, the pre-defined pricing strategies having different combinations of reference pricing indices of pre-defined pricing strategy variables, the pricing strategy identified by comparing the first pricing index and the second pricing index to the reference pricing indices of the pre-defined pricing strategy variables of the pre-defined pricing strategies.

16. The computer-readable medium of claim 15, wherein the instructions further cause the processor to:

identify the product category associated with the sales data of the first store; and identify the pricing strategy for the first store for the product category.

17. The computer-readable medium of claim 15, wherein the pricing strategy is a first pricing strategy, and wherein the first store is associated with a retailer, the retailer associated with at least one of the second store or a third store, and wherein the instructions cause the processor to identify a pricing strategy for the retailer based on the first pricing strategy for the first store and a second pricing strategy for the at least one of the second store or the third store.

18. The computer-readable medium of claim 15, wherein the instructions cause the processor to identify the pricing strategy for the first store based on a comparison of the first pricing index to first reference pricing indices indexes of the set of pre-defined pricing strategies corresponding to the first pricing strategy variable.

19. The computer-readable medium of claim 15, wherein the instructions cause the processor to cluster the first store based on the first pricing index relative to the reference pricing indices.

20. The computer-readable medium of claim 15, wherein the pricing strategy is a first pricing strategy, and wherein the instructions further cause the processor to identify a second pricing strategy for the second stored from the from the set of pre-defined pricing strategies by comparing pricing indices of the second store to the reference pricing indices of the pre-defined pricing strategy variables of the pre-defined pricing strategies.

21. The computer-readable medium of claim 15, wherein the second pricing strategy is different than the first pricing strategy.

* * * * *